United States Patent [19]

Kato

[11] Patent Number: 5,109,826
[45] Date of Patent: May 5, 1992

[54] SHIFT SHOCK ATTENUATION SYSTEM FOR AUTOMOTIVE POWER TRAIN INCLUDING AUTOMATIC TRANSMISSION AND TURBOCHARGED INTERNAL COMBUSTION ENGINE

[75] Inventor: Yuji Kato, Tokyo, Japan

[73] Assignee: Nissan Motor Co., Ltd., Japan

[21] Appl. No.: 556,714

[22] Filed: Jul. 25, 1990

[30] Foreign Application Priority Data

Jul. 28, 1989 [JP] Japan .................................. 1-195602

[51] Int. Cl.$^5$ ........................... F02D 23/00; F02P 5/00
[52] U.S. Cl. ..................................... 123/564; 74/858; 74/866; 123/421
[58] Field of Search ...................... 123/564, 421, 559.3; 60/602; 74/858; 1/866

[56] References Cited

U.S. PATENT DOCUMENTS

| 4,355,550 | 10/1982 | Will et al. |
| 4,403,527 | 9/1983 | Mohl et al. |
| 4,680,992 | 7/1987 | Hayasaki et al. |
| 4,691,285 | 9/1987 | Takeda .............................. 74/866 X |
| 4,730,521 | 3/1988 | Hayasaki et al. |
| 4,744,031 | 5/1988 | Takeda et al. ...................... 74/866 X |
| 4,939,956 | 7/1990 | Takizawa ............................ 74/858 |

FOREIGN PATENT DOCUMENTS

| 3148075 | 6/1982 | Fed. Rep. of Germany |
| 3703481 | 8/1987 | Fed. Rep. of Germany |
| 3717368 | 4/1988 | Fed. Rep. of Germany |
| 3831575 | 4/1989 | Fed. Rep. of Germany |

Primary Examiner—Michael Koczo
Attorney, Agent, or Firm—Lowe, Price, LeBlanc & Becker

[57] ABSTRACT

Supercharge pressure is vented from the induction manifold in response to a shift command for a shift which requires engine torque reduction for shift shock attenuation. The ignition is subsequently retarded during the inertia phase of the shift. The supercharge pressure reduces the amount of torque being produced by the engine prior a further reduction by ignition retardation. At the end of the inertia phase the ignition retard and pressure relief are stopped.

6 Claims, 6 Drawing Sheets

| GEAR RATIO | FRICTION ELEMENT | R/C | H/C | F/C | B/B | L&R/B |
|---|---|---|---|---|---|---|
| REVERSE | | ○ | | | | ○ |
| FORWARD | 1ST | | | ○ | | |
| | 2ND | | | ○ | ○ | |
| | 3RD | | ○ | ○ | | |
| | 4TH | | ○ | ○ | ○ | |

SHIFT SHOCK ATTENUATION SYSTEM FOR AUTOMOTIVE POWER TRAIN INCLUDING AUTOMATIC TRANSMISSION AND TURBOCHARGED INTERNAL COMBUSTION ENGINE

BACKGROUND OF THE INVENTION

1. Field of the Invention

The present invention relates generally to an automotive power train including an automatic transmission which is coupled to a supercharged internal combustion engine, and more specifically to a transmission shift shock attenuation arrangement which controls both the engine ignition and the supercharge pressure produced by a turbocharger.

2. Description of the Prior Art

It is known to combine engine ignition timing control with transmission shifting for the purposes of reducing shift shock. However, in the case of engines which are equipped with superchargers or turbochargers, and the shift shock attenuating control arrangement is applied only to the engine ignition, a problem has been encountered in that the cylinder pressure tends to be higher than in the case of naturally aspirated engines.

In the case wherein the ignition is retarded to a level relatively close to TDC in supercharged engines, the cylinder pressure tends to increase to relatively high levels.

As a result of this higher pressure, a higher voltage which must be applied to the electrodes of the spark plug or plugs which are exposed to the combustion chamber in order to induce the spark to actually are across the spark plug electrodes. This of course tends to invite misfiring with attendant increases in vibration and noxious emissions.

However, in order to provide the required high voltage a further problem is experienced in that it becomes necessary to prevent leakage from the high tension cords which form part of the ignition system. This requires that the spark plug peripheral clearance be set at a relatively large value.

Accordingly, it has been very difficult in actual practice to obtain the desired engine output control simply by retarding the ignition in supercharged engines.

Further, when it has been attempted to achieve a reduction in the output of the engine by simply reducing the supercharge pressure, the response characteristics of the engine have tended to deteriorate to the degree that shock attenuation is again rendered inadequate.

SUMMARY OF THE INVENTION

It is an object of the present invention to provide an arrangement via which shift shock can be attenuated without loss of engine output characteristics by selectively retarding the ignition timing in the presence of a reduction of the supercharge pressure supplied to the cylinders of an internal combustion engine.

In brief, this object is achieved by venting some of the supercharge pressure from the induction manifold in response to a shift command for a shift which requires engine torque reduction for shift shock attenuation; and by subsequently retarding the ignition during the inertia phase of the shift. This allows the supercharge pressure to drop off and hence gradually reduce the amount of torque being produced by the engine prior the reduction induced by the ignition retardation. Following the end of the inertia phase the ignition retard and pressure relief are both stopped. The supercharge pressure then begins to rises back to its normal level. The torque produced by the engine therefore develops relatively smoothly with the increase in supercharge pressure.

More specifically, a first aspect of the present invention is in the form of a system comprising internal combustion engine having a supercharger, and an automatic transmission which transmission is operatively connected with the engine, the system featuring: means for determining first, second and third time points which respectively mark first, second and third events which occur during a shift of said transmission; means for reducing the supercharge pressure which is supplied to said engine between said first and third time points; and means for retarding the engine ignition timing between said second and third time points.

A second aspect of the invention comes in a method of operating a transmission which is operatively connected with a supercharged internal combustion engine, the method featuring the steps of: sensing the need for a shift of said transmission which requires engine torque reduction for shift shock attenuation and issuing a shift command; reducing the supercharge pressure which is supplied to the engine from the time that the shift command is issued; monitoring the operation of the shift; detecting a predetermined phase of said shift; retarding the engine ignition during said phase; and stopping the supercharge pressure reduction at the end of said phase.

A further aspect of the present invention comes in a transmission which is operatively connected with a supercharged internal combustion engine, the transmission and engine featuring: means for sensing the need for a shift of said transmission which requires engine torque reduction for shift shock attenuation and for issuing a shift command; means for reducing the supercharge pressure which is supplied to the engine from the time that the shift command is issued; means for monitoring the operation of the shift; means for detecting a predetermined phase of said shift; means for retarding the ignition of the engine during said phase; and means for stopping the supercharge pressure reduction following the end of said phase.

Another aspect of the present invention comes in the form of a vehicular power train which features: an engine, said engine having an induction passage; a throttle valve operatively disposed in the induction passage; an engine load sensor operatively connected with the throttle valve for sensing the position of the same and issuing a signal indicative of the load on the engine; a supercharger disposed in the induction conduit upstream of said throttle valve; a vent valve disposed in said induction conduit at a location downstream of said supercharger; an engine control unit; ignition control circuitry included in said engine control unit for determining the timing with which the engine ignition is induced; supercharge pressure control circuitry included in said engine control unit for controlling the operation of said vent valve; a transmission; an engine speed sensor; a vehicle speed sensor operatively connected with an output shaft rotational speed sensor; a transmission control unit operatively connected with said output shaft rotational speed sensor and said engine speed sensor, said transmission control unit including: a shift control means which is responsive to the outputs of said engine load sensor and the vehicle speed sensor for determining if a shift is necessary and if engine torque reduction is necessary during said shift, said shift control means further including circuitry for outputting a signal to said supercharge pressure control circuitry and said ignition control circuitry which indicate that a reduction in the supercharge pressure and a retardation in the ignition timing are necessary, in the event that a shift wherein a torque reduction is indicated as being necessary is determined.

DETAILED DESCRIPTION OF THE PREFERRED EMBODIMENTS

Figure 1:
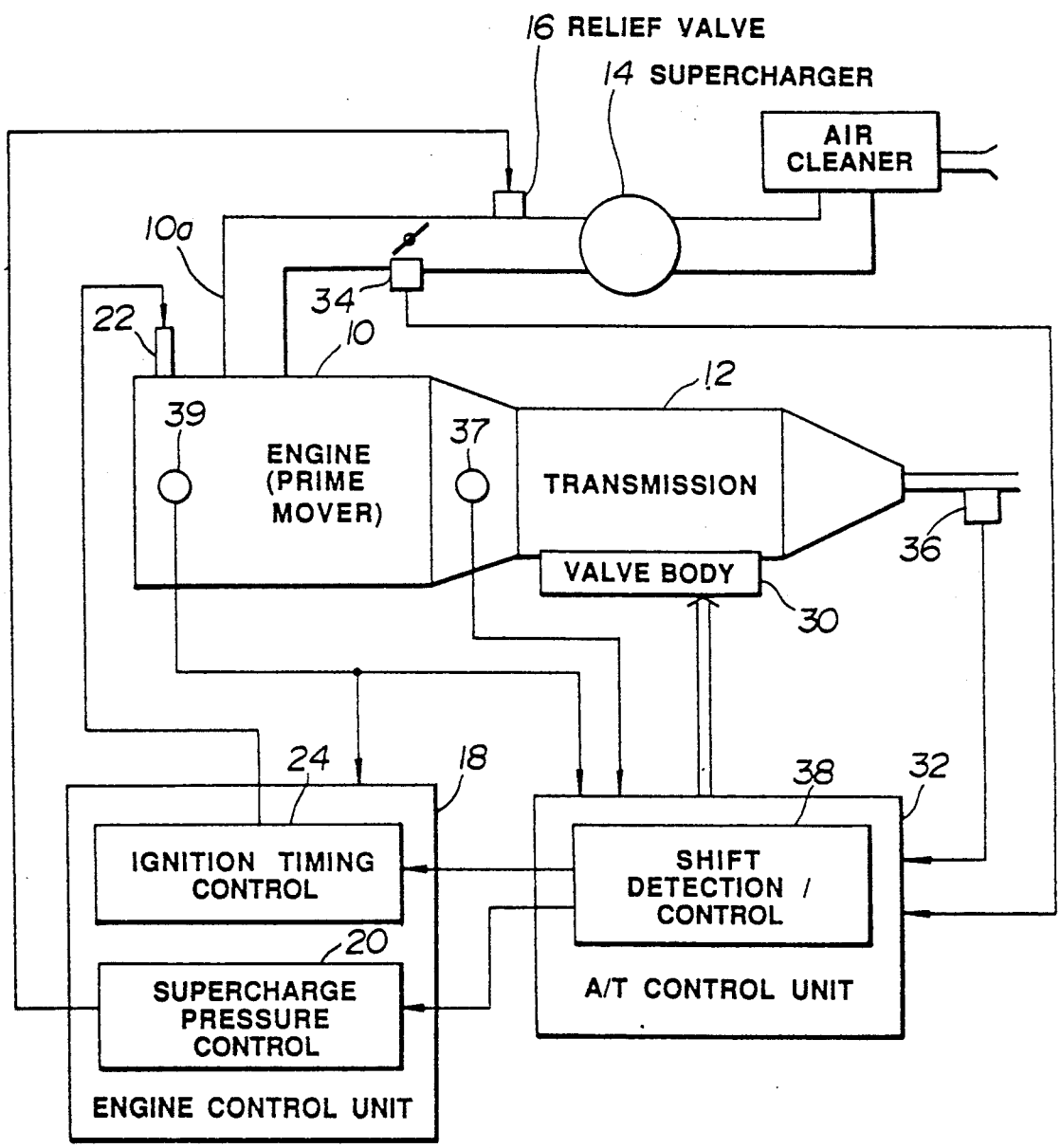
FIG. 1 is a schematic illustration of an engine/transmission system to which the present invention is applied.

FIG. 1 shows and engine/transmission power train arrangement to which the present invention is applied. In this arrangement an engine 10 is operatively connected to an automatic transmission by way of a torque converter. The engine induction conduit 10a includes a supercharging device 14. In this instance this device can take the form of either a supercharger (driven by mechanical connection with the engine output shaft or the like) or a turbocharger (driven the engine exhaust gases).

A relief valve 16 is located downstream of the supercharger 14 and arranged to be selectively operable to vent a portion of the pressure which develops in the induction system.

An engine control unit 18 includes circuitry 20 which is arranged to output a vent control signal to the relief valve 16.

The engine control unit 18 further includes ignition control circuitry 24 which is operatively connected with a spark plug or plugs (schematically illustrated by 22). This circuit 24 is adapted to control the timing or crank angle at which the spark is induced to bridge the gap of the spark plug electrodes.

Figure 2:
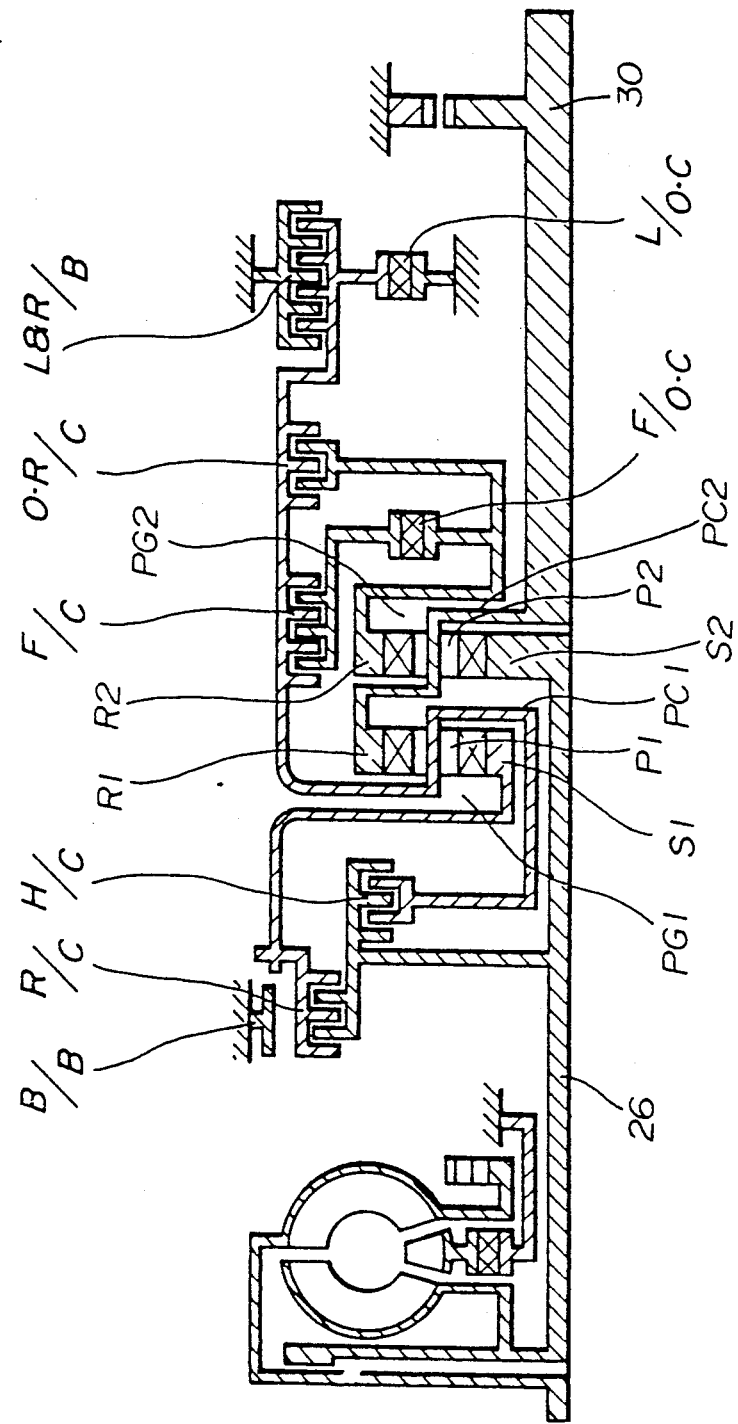
FIG. 2 is a sectional view showing an example of the gear train of the depicted in FIG. 1.

The transmission 12 in this instance comprises first and second planetary gear units PG1 and PG2 which are arranged in tandem. As shown in FIG. 2, the forward planetary gear PG1 comprises a front sun gear S1, front pinion gears P1, a front internal or ring gear R1 and a pinion gear carrier PC1. The rear planetary gear similarly comprises a sun gear S2, front pinion gears P2, a front internal or ring gear R2 and a pinion gear carrier PC2.

In this arrangement a transmission input shaft 26 is arranged to be selectively connectable with the front sun gear S1 by way of a reverse clutch R/C, and selectively connectable with the front pinion gear carrier PC1 by way of a high clutch H/C.

The front planetary gear carrier PC1 is selectively connectable with the rear ring gear R2 by way of a forward clutch F/C; the front sun gear S1 is connectable with the transmission housing through a band brake B/B, the front carrier PC1 is selectively connectable with the transmission housing through a low and reverse brake L&R/B.

In addition to this, a forward overrunning clutch F/O is arranged between the forward clutch F/C and the rear ring gear R2; while a low overrunning clutch L/O is arranged between front planetary gear carrier PC1 and the transmission housing. An overrunning clutch O.R/C is to provide a selective connection between front planetary gear carrier PC1 and the rear ring gear S2 and is arranged in parallel with the F/O.C.

Figures 3, 7:
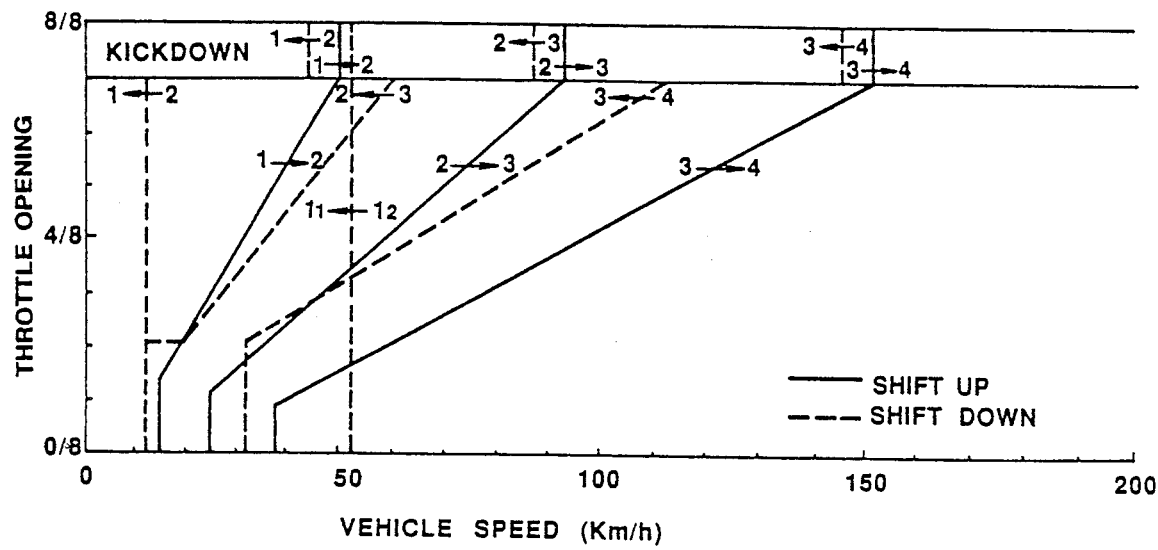
FIG. 3 is a shift schedule which shows, in terms of engine load and vehicle speed, the shift characteristics of the transmission illustrated in FIG. 1.
FIG. 7 is a table depicting which friction elements of the transmission shown in FIG. 2, are required to be engaged in order to produce reverse and first to fourth forward speeds the different gear ratios.

By selectively supplying the above mentioned friction elements with line pressure in accordance with the table shown in FIG. 7, a plurality (4) forward speeds and one reverse gear ratio can be selectively produced. In this table, the circles denote the friction elements which are supplied with the above mentioned line pressure.

It should also be noted that with the gear train illustrated in FIG. 2 the forward overrunning clutch F/O.C is arranged such that the front planetary gear carrier PC1 and the rear ring gear R2 are prevented from rotating in the opposite direction from one another.

It should also be noted that, even though it is not shown in the table shown in FIG. 10, when the above mentioned overrunning clutch O.R/C is engaged, the function of the forward overrunning clutch is negated and engine braking is rendered possible.

The input shaft 26 is operatively connected with the crankshaft of the engine through a torque converter T/C.

A valve body 30 which houses a plurality of spool valves, accumulators and orifice arrangements, is arranged to control the supply of hydraulic line pressure to the servos of the above listed friction elements. By way of example only, the valve body 30 may comprise three solenoid valves, two of which control the shifting of the transmission and the other which controls the level of line pressure.

For disclosure relating to such a type of arrangement, reference may be had to U.S. Pat. No. 4,730,521 issued on Mar. 15, 1988 in the name of Hayasaki et al and to U.S. Pat. No. 4,680,992 issued on Jul. 21, 1988 in the name of Hayasaki et al. Reference may also be had to copending U.S. patent application Ser. No. 07/336,430 filed on Apr. 11, 1989 in the name of Narita.

In brief, this latter mentioned document discloses an arrangement wherein during non-shift (non-transitory) modes of transmission operation, the line pressure is controlled according to a first control schedule. Upon a shift being initiated a second control schedule is used. The use of this schedule is maintained until such time as the ratio of the transmission input shaft rotational speed to the transmission output shaft rotational speed reaches a predetermined limit whereafter a third control schedule is utilized. Control is switched from the third control schedule to the first one upon the expiration of a predetermined period which is timed from the point in time a decision that a shift between gears of the transmission should be implemented.

As mentioned above, the operation of the valve body 30 is controlled by transmission control circuit 32. As shown in FIG. 1 this circuit is supplied with inputs from a throttle position sensor 34, a vehicle speed sensor 36

(transmission output shaft rotational speed sensor), a transmission input rotational speed sensor 37, and engine speed sensor 39.

The transmission control circuit 32 contains shift detection/control circuitry 38 which is responsive to the engine load as indicated by the throttle valve position sensor 34, the vehicle speed, as indicated by the transmission output shaft rotational speed sensor 36, and which contains prememorized shift control data of the nature depicted in shift control schedule of FIG. 3.

When the load/speed coordinate cross a shift line, shift detection/control circuitry 38 responds by determining the direction and line involved and issues the appropriate control signals to the valve body 30. It then monitors the shifting (viz., monitors the inputs from one or more the inputs from sensors 36, 37 and 39) in a manner wherein the shift initiation, termination and inertia phase time data is determined and set in memory.

In the event that the type of shift which is induced and the operating conditions (viz., the magnitudes of the vehicle speed and engine load) under which the shift will take place, is such as to require torque reduction for the purposes of attenuating shift shock, a signal is issued to the spark ignition control circuit 24 of the engine control unit at a time which corresponds to the beginning of the inertia phase. This signal also determines the degree by which the engine ignition need be retarded.

It will be noted that the inertia phase can be determined by monitoring the outputs of sensors 36 and 37 and determining the time from which the input/output rotational speed ratio begins to change from a value indicative of one gear until it reaches that indicative of the gear to which the shift is being made.

On the other hand, a signal is issued to the supercharge pressure control circuit 20 which induces the relief valve 16 to open from the instant a shift command, (viz., a command which initiates the shifting operation) is issued, until the end of the inertia phase. This permits the level of the supercharge pressure prevailing in the induction manifold downstream of the supercharging device 14 to drop off prior ignition retard being induced.

Figure 4:
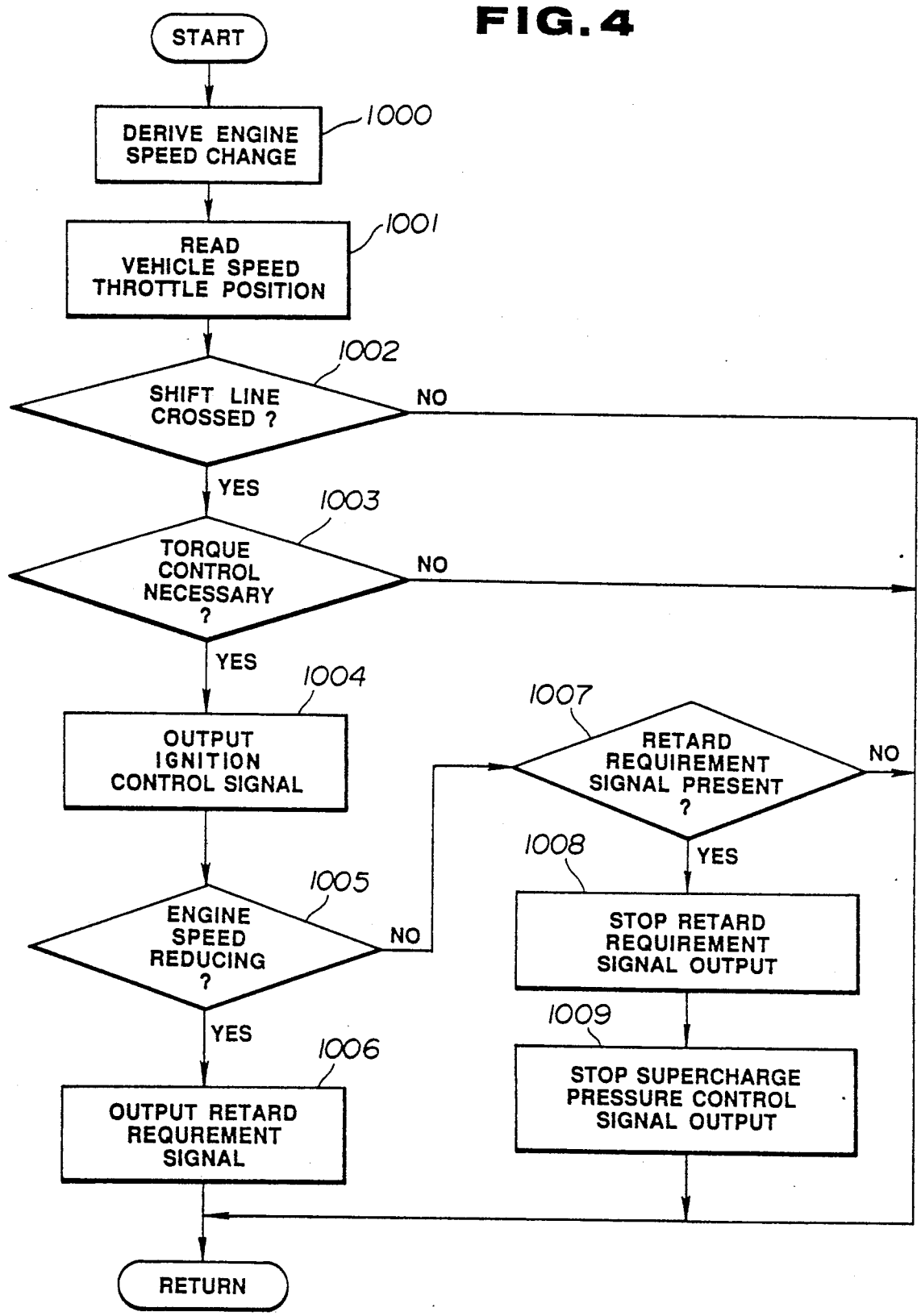
FIGS. 4 and 5 are flow charts which show the steps which characterize the operation of the present invention.
Figure 5:
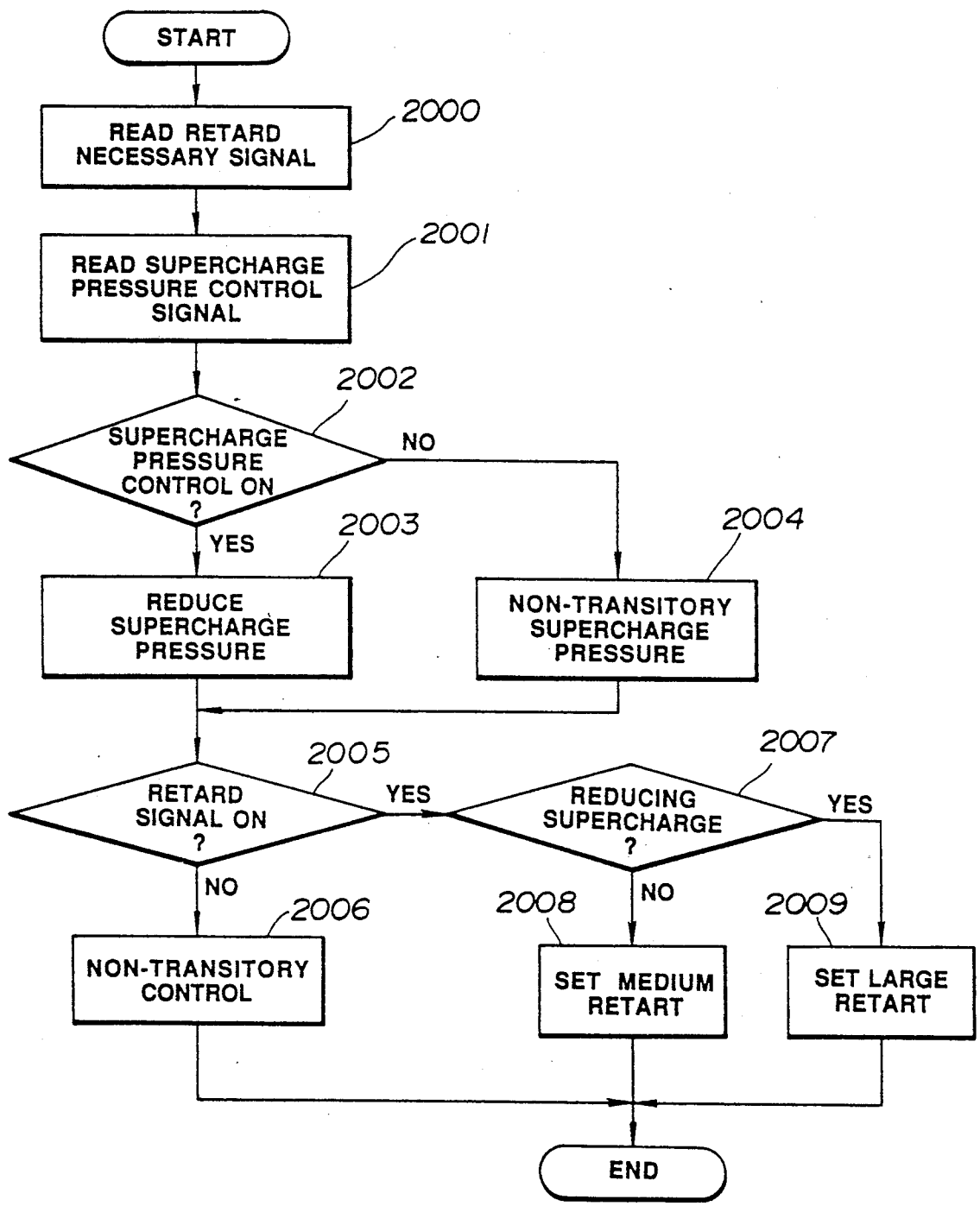

FIGS. 4 and 5 show in flow chart form, the steps which characterize the operation of the present invention.

The routine which is depicted in FIG. 4 is such run in the A/T control unit 32 at predetermined intervals such as 10 ms. The first step of this routine 1000 is such as to determine the change in the engine rotational speed. This can be done by sampling the engine speed (output of sensor 39) on each run of the routine and comparing the instant and previously recorded values. As the routine is run at predetermined time intervals the rate at which the engine speed is changing and its polarity (viz., positive or negative) can be readily calculated.

At step 1001 the output of the throttle valve position sensor 34 and the vehicle speed sensor 36 (transmission output shaft rotational speed) are read and the values set in memory for further processing.

At step 1002 the engine load (viz., the throttle valve position) and vehicle speed data gathered in the previous step are used to determine if the coordinate defined by the instant engine load and vehicle speed values has crossed over a shift line of the shift schedule or not.

In the event that no shift line has been either reached or crossed in a manner which demands that the transmission be induced to undergo a shift, then the routine flows to return. On the other hand, if the instant engine load and vehicle speed conditions are such as demand that a shift be implemented, the routine flows to step 1003 wherein it is determined if the shift, which is about to be implemented, is such as to require that the engine torque need be subject to reduction or not. This decision is dependent on whether the shift is going to be an upshift or a downshift, whether the engine load is high or low, in accordance with the engine and vehicle speeds, etc.

In the event that the outcome of the enquiry at step 1003 is affirmative (viz., torque reduction is necessary) then the routine flows to step 1004 wherein a signal is output from the transmission control unit 32 to the ignition control circuit 24 of the engine control unit 18. Next, at step 1005, it is determined if the engine speed change determined in step 1000 has a negative value or not (viz., is reducing or not). In the event that the engine speed is reducing then it is assumed that the inertia phase has been entered (see FIG. 6) and at step 1006 a command to retard the ignition timing is issued.

On the other hand, if the engine speed is not reducing (an operational condition which occurs before and after the inertia phase) then at step 1007 an inquiry is performed to see if an ignition retard requirement signal is currently being issued to the engine control unit 18 or not.

If the outcome is negative (NO) the routine returns. However, in the case of an affirmative outcome, it is then assumed that the inertia phase has finished and it is now time to stop the torque reducing operations. The routine accordingly flow to step 1008 wherein a command which cancels the retard signal is issued. Following this, at step 1009 a command which cancels a supercharge pressure control signal by the supercharge pressure control circuit 20, is issued.

The routine depicted in the flow chart of FIG. 5 is run in the engine control unit and which is arranged to respond to the signals indicative of the need to retard and to reduce pressure generated by the A/T control unit 32 in response to the running of the FIG. 4 routine.

The first two steps of this routine are such as to determine the status of a retard necessary and supercharge pressure reduction necessary signals which are issued by the engine control unit 18—viz., determine if the signals are at a high or low level etc.

At step 2002 an inquiry is performed to determine if the supercharge control signal being output by the A/T control unit 32 is such as to indicate if the relief valve 16 need be opened or not. If supercharge pressure reduction is indicated by the A/T control unit 32 as being necessary, then the routine flows to step 2003 wherein a command to output a signal to the relief valve and open the same is issued.

On the other hand, in the event that it is indicated that the transmission is not undergoing an operation which requires a torque reduction via supercharge pressure reduction, then the routine flows to step 2004 wherein a command to implement normal supercharge control (viz., non-transitory control wherein the relief valve is closed) is issued.

At step 2005 the status of the ignition retard requirement signal being issued by the A/T control circuit 32, is sampled. If no such requirement exists then the routine flows to step 2006 wherein a command which induces "non-transitory" or non-shifting type ignition control is issued.

On the other hand, in the event that a need for engine ignition timing is found to be present, then the routine goes across to step 2007 wherein the output to the relief valve 16 is sampled.

In the event that the relief valve 16 is not being energized to assume an open state and relief supercharge pressure, then it is assumed that a large torque reduction for shift shock attenuation purposes is not required and the routine flows to step 2008 wherein a command is issued which induces the implementation of a "medium" degree of engine retard. This level of retard is selected in view of the effect of the cylinder pressure by the supercharge pressure which is being supplied (relief valve closed) and the degree by which it is necessary to lower engine torque generation.

On the other hand, if the outcome of the inquiry conducted at step 2007 is such as to indicate that the relief valve 16 is open (viz., supercharge pressure is being reduced), then the routine flows to step 2009 wherein a command is issued to induce the ignition to be reduced by a relatively large amount.

That is to say, in the event that the supercharge pressure is being reduced via the opening of the relief valve, then the pressure which develops in the engine cylinders at or about TDC will be lowered to the degree that a large ignition retard is rendered possible and will not require a very high voltage to ensure that ignition of the air-fuel mixture actually takes place.

Figure 6:
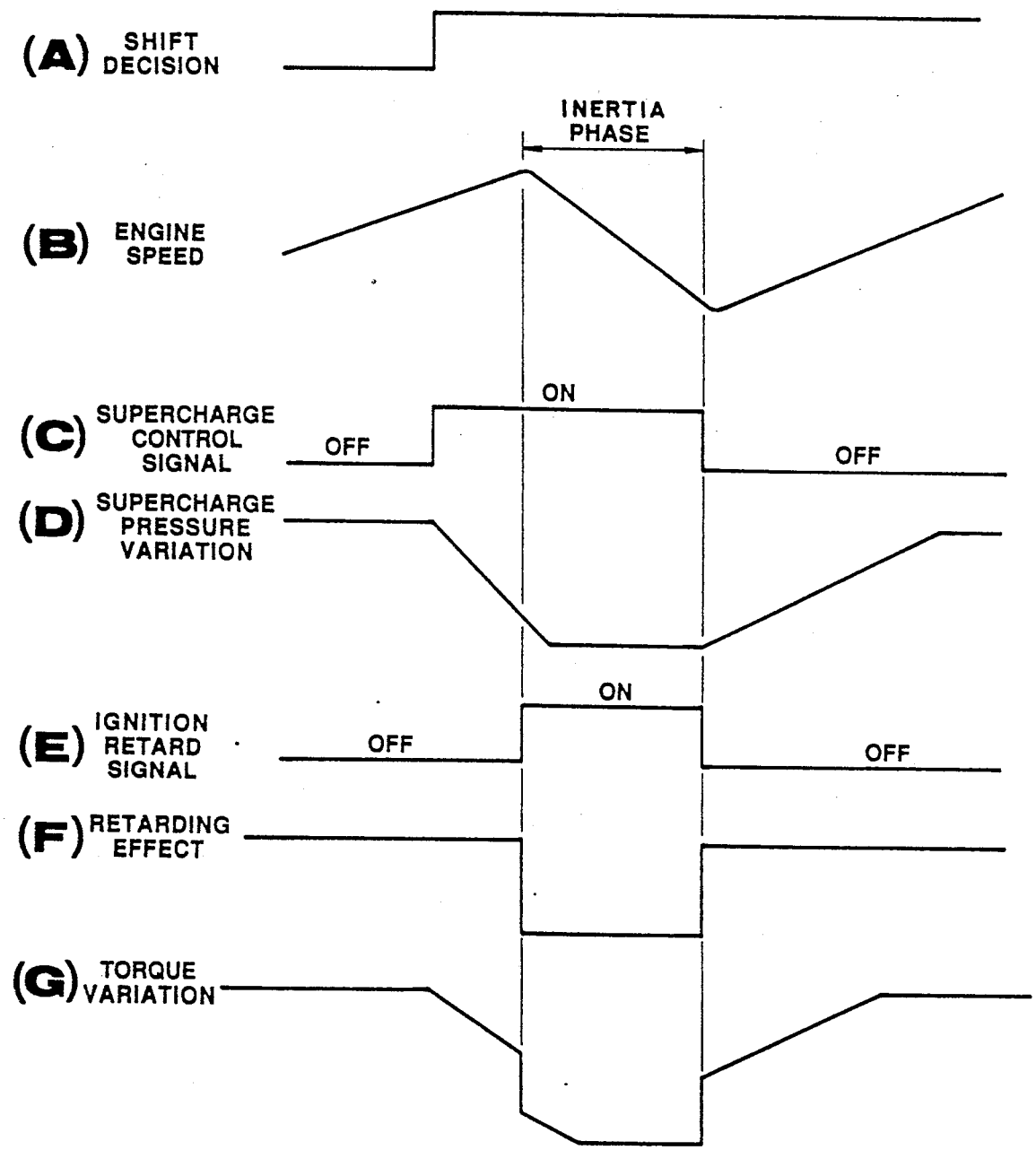
FIG. 6 is a timing chart which shows the variations in the engine torque which result from the control of the engine ignition and the supercharge pressure.

The control provided by the above described routines is graphically depicted in the timing chart of FIG. 6. As will be noted, from the time the shift decision signal (for a shift requiring torque reduction for shift shock attenuation purposes) is issued, a signal is issued to the relief valve 16 to open the same. The supercharge pressure decreases and continues to decrease into the inertia phase period. Upon detection of the inertia phase, which can be determined by comparing the outputs of sensors 36 & 37, an ignition retard requirement signal is issued. At the end of the inertia phase both the ignition retard and the pressure relief functions are stopped.

This results in the engine torque reducing relatively smoothly and then increasing again from the end of the inertia phase.

The result of this control is such that the engine torque is reduced in a manner which permits the attenuation of shift shock without inviting misfiring and/or temporarily unstable engine response characteristics.

Of course it is within the scope of the present invention to further supplement the shock attenuation control by combining the above pressure and ignition control with a control which modifies the level of line pressure which is used to engage the friction elements of the transmission.

It is further within the scope of the invention to vary the timing at which the ignition and supercharge controls are terminated. For example, as the supercharge pressure tends to increase gradually, a timer could be used to close the vent valve 16 prior the end of the inertia phase if so desired.

It should also be noted that the use of a transmission input shaft rotational speed sensor such as sensor 37, can be omitted and the output of the engine speed sensor 39 relied upon if it is desired to simplify the system.

In this disclosure, there are shown and described only the preferred embodiments of the invention, but, as aforementioned, it is to be understood that the invention is capable of use in various other combinations and environments and is capable of changes or modifications within the scope of the inventive concept as expressed herein.

What is claimed is:

1. In a system comprising an internal combustion engine having a supercharger, and an automatic transmission which transmission is operatively connected with the engine:
   means for determining specific first, second and third time points which respectively correspond to predetermined first, second and third events which occur during a shift of said transmission;
   means for reducing the supercharge pressure which is supplied to said engine between said first and third time points; and
   means for retarding the engine ignition timing between said second and third time points.

2. In a method of operating a transmission which is operatively connected with a supercharged internal combustion engine, the steps of:
   sensing the need for a shift of said transmission which requires engine torque reduction for shift shock attenuation and issuing a shift command;
   reducing the supercharge pressure which is supplied to the engine from the time that the shift command is issued;
   monitoring the operation of the shift;
   detecting a predetermined phase of said shift;
   retarding the engine ignition during said phase; and
   stopping the supercharge pressure reduction at the end of said phase.

3. A method as claimed in claim 2 wherein said predetermined phase is the inertial phase wherein the engine speed reduces.

4. In a transmission which is operatively connected with a supercharged internal combustion engine:
   means for sensing the need for a shift of said transmission which requires engine torque reduction for shift shock attenuation and for issuing a shift command;
   means for reducing the supercharge pressure which is supplied to the engine from the time that the shift command is issued;
   means for monitoring the operation of the shift;
   means for detecting a predetermined phase of said shift;
   means for retarding the ignition of the engine during said phase; and
   means for stopping the supercharge pressure reduction following the end of said phase.

5. A method as claimed in claim 4 wherein said predetermined phase is the inertia phase wherein the engine speed reduces.

6. In a vehicular power train
   an engine, said engine having an induction passage;
   a throttle valve operatively disposed in the induction passage;
   an engine load sensor operatively connected with the throttle valve for sensing the position of said throttle valve and issuing a signal indicative of the load on the engine;
   a supercharger device disposed in the induction conduit upstream of said throttle valve;
   a vent valve disposed in said induction conduit at a location downstream of said supercharger for venting pressure developed by said supercharger device;
   an engine control unit;

ignition control circuitry included in said engine control unit for determining the timing with which the engine ignition is induced;

supercharge pressure control circuitry included in said engine control unit for controlling the operation of said vent valve;

a transmission;

an engine speed sensor;

a vehicle speed sensor operatively connected with an output shaft rotational speed sensor;

a transmission control unit operatively connected with said output shaft rotational speed sensor and said engine speed sensor, said transmission control unit including:

a shift control means which is responsive to the outputs of said engine load sensor and the vehicle speed sensor for determining if a shift is necessary and if engine torque reduction is necessary during said shift, said shift control means further including circuitry for outputting a signal to said supercharge pressure control circuitry and said ignition control circuitry which signal indicates that at least one of a reduction in the supercharge pressure and a retardation in the ignition timing is necessary, in the event that a shift wherein a torque reduction is indicated as being necessary is determined.

* * * * *